United States Patent Office 3,531,500
Patented Sept. 29, 1970

3,531,500
TRIS(DINITRATOMETHYL)TRIOXANE
John A. Brown, Berkeley Heights, N.J., assignor to Esso Research Engineering Company, a corporation of Delaware
No Drawing. Filed July 25, 1962, Ser. No. 214,161
Int. Cl. C07d *19/00*
U.S. Cl. 260—340.7      2 Claims This invention is concerned with the synthesis of tris-(dinitratomethyl)trioxane, which is believed to be a new compound useful as a nonvolatile liquid high-energy oxidizer, and useful as a high-energy plasticizing oxidizer for compounding with high-energy solid rocket propellant fuels and binders.

Tris(dinitratomethyl)trioxane contains one nitrato or nitroxy group ($ONO_2$) per carbon atom plus added oxygen. The fact that it exists normally in a liquid state and can be isolated by use of distillation from impurities indicates that it is suitably stable for use as a plasticizer with various solid high-energy compounds, such as nitrocellulose, other carbohydrate nitrates, and $NF_2$ adducts of unsaturated organic compounds that have been found compatible with organic nitrates.

A satisfactory method for synthesizing the tris(dinitratomethyl)trioxane has been demonstrated as shown in the following example.

EXAMPLE

Tris(dinitratomethyl)trioxane is prepared by adding slowly a solution of monomeric glyoxal in an alkyl halide, e.g. methylene chloride, to mixed nitric and sulfuric acids at temperatures in the range of −35° to 0° C. A resulting emulsion formed by reaction of the glyoxal with the mixed acids is poured onto cracked ice; and the organic layer which separates from an aqueous layer is removed, washed with water, dried, and distilled to obtain the residual oily tris(dinitratomethyl)trioxane. The methylene chloride diluent and low molecular weight byproducts are removed by the distillation. In the reaction, a small amount of methylene glycol dinitrate is formed, presumably from traces of formaldehyde, and may be removed by the distillation. A small amount of nitrated polymer of variable nitrato or nitroxy content may be formed also. Such byproduct compounds may be removed, if desired, by fractional distillation and/or chromatography.

Elemental analyses indicate that the isolated main product has a formula in good agreement with the compositional formula $C_6H_6N_6O_{21}$. Infrared analyses indicate the presence of gem-dinitrato groups and the absence of carbonyl groups. The substance is a high-boiling point yellow liquid, which from the analyses and synthesis is indicated to have the following structural formula:

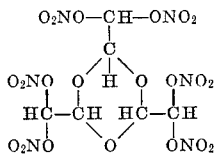

In the synthesis, modifications may be made, but experiments have indicated that it is important to use the monomeric glyoxal as the reactant. Monomeric glyoxal has the formula CHOCHO and can be obtained by decomposition of the polymeric glyoxal. The preferred nitrating agent is the mixed acid which contains 50% $H_2SO_4$ and 50% $HNO_3$. Various drying agents may be used for removing moisture from the product after it is washed. Anhydrous magnesium sulfate is a satisfactory drying agent.

In carrying out the reaction of the glyoxal with the mixed acid, stirring is desirable and can be performed by bubbling nitrogen gas through the liquid acid into which the solution of the glyoxal is dropped.

Tris(dinitratomethyl)trioxane is in the category of nitrate esters which contain 3 to 6 carbon atoms in the molecule, with one nitrate group per carbon and with a symmetrical structure that imparts stability. This class of compounds includes nitroglycerin (glyceryl trinitrate), which is one of the more stable nitrate esters when made suitably free of byproducts that make it too sensitive.

Tris(dinitratomethyl)trioxane is indicated to be a good plasticizer for use with nitrocellulose in the preparation of gun and rocket propellants. Thus, it can fill a need in this respect. In a doublebase type propellant, tris(dinitratomethyl)trioxane compounded with nitrocellulose, a solid oxidizer such as ammonium perchlorate, and powdered metal fuel, e.g. powdered aluminum, is indicated to form a propellant having a specific impulse of approximately that obtained with nitroglycerin, which is above 245.

As a replacement for nitroglycerin, tris(dinitratomethyl)trioxane can have advantages in its low volatility with respect to physiological action and stability. It may be used with different kinds of solvents. It may be used to promote combustion of hydrocarbon fuels.

The invention described is claimed as follows:

1. Tris(dinitratomethyl)trioxane having the formula:

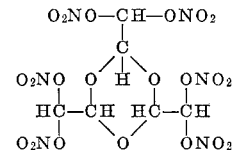

2. The method of forming a high-energy compound which comprises reacting monomeric glyoxal with mixed nitric and sulfuric acids at a reaction temperature of about −35° to 0° C. to obtain an emulsion, and recovering a high-boiling point reaction product organic liquid having the composition $C_6H_6N_6O_{21}$.

References Cited

UNITED STATES PATENTS 3,071,598   1/1963   Hass et al. _____ 260—340.7 X
3,071,617   1/1963   Hass _____ 260—340.7 X LELAND A. SEBASTIAN, Primary Examiner U.S. Cl. X.R.

149—38, 88